United States Patent
Tan et al.

(12)

(10) Patent No.: US 12,540,531 B2
(45) Date of Patent: Feb. 3, 2026

(54) WATER INVASION-ORIENTED DYNAMIC PRODUCTION ALLOCATION METHOD FOR WATER-BEARING CARBONATITE GAS RESERVOIR

(71) Applicant: Southwest Petroleum University, Chengdu (CN)

(72) Inventors: Xiaohua Tan, Chengdu (CN); Xiaojun Zhou, Chengdu (CN); Xiaobing Han, Chengdu (CN); Xian Peng, Chengdu (CN); Longxin Li, Chengdu (CN); Qingyan Mei, Chengdu (CN); Qian Li, Chengdu (CN); Zhenglin Mao, Chengdu (CN)

(*) Notice: Subject to any disclaimer, the term of this patent is extended or adjusted under 35 U.S.C. 154(b) by 600 days.

(21) Appl. No.: 17/859,414

(22) Filed: Jul. 7, 2022

(65) Prior Publication Data

US 2023/0010689 A1     Jan. 12, 2023

(30) Foreign Application Priority Data

Jul. 9, 2021   (CN) .......................... 202110775543.0

(51) Int. Cl.
   *E21B 43/00*       (2006.01)
   *E21B 43/16*       (2006.01)

(52) U.S. Cl.
   CPC .............. *E21B 43/00* (2013.01); *E21B 43/16* (2013.01); *E21B 2200/20* (2020.05)

(58) Field of Classification Search
   CPC ....... E21B 43/00; E21B 43/16; E21B 2200/20
   See application file for complete search history.

(56) References Cited

U.S. PATENT DOCUMENTS 7,627,461 B2 * 12/2009 Guyaguler .............. E21B 43/00
                                                        703/10
8,078,444 B2 * 12/2011 Rashid ................... E21B 43/122
                                                        703/10

OTHER PUBLICATIONS

Rashid, K., et al. "A Survey of Methods for Gas-Lift Optimization" Modelling & Simulation in Engineering, vol. 2012, article ID 516807 (2012) (Year: 2012).*

Alarcon, G., et al. "Global Optimization of Gas Allocation to a Group of Wells in Artificial Lift Using Nonlinear Constrained Programming" J. Energy Resources Tech., Transactions of the ASME, vol. 124, No. 4, pp. 262-268 (2002) (Year: 2002).*

(Continued)

*Primary Examiner* — Jay Hann
(74) *Attorney, Agent, or Firm* — Addison D. Ault; IPGentleman Intellectual Property Services, LLC

(57) ABSTRACT

The problem that water breakthrough of a single well is too early due to uneven water invasion of an existing water-bearing carbonatite gas reservoir is solved. According to the technical scheme, on the basis of an original gas well production allocation scheme of a water-bearing carbonatite gas reservoir, the average water invasion rate of the reservoir is calculated as a stability reference of water invasion rates throughout the production period. A new water invasion-oriented production allocation method is designed from two aspects of stability of water invasion and uniformity of water invasion driving and meanwhile, a reasonable production allocation range is predicted through a traditional deliverability equation, a n d a water invasion-oriented dynamic production allocation mathematical model is established.

1 Claim, 4 Drawing Sheets

(56) References Cited

OTHER PUBLICATIONS

Dutta-Roy, K. & Kattapuram, J. "A New Approach to Gas-Lift Allocation Optimization" Society of Petroleum Engineers, SPE 38333, pp. 685-691 (1997) (Year: 1997).*

Agarwal, R.G., et al. "The Importance of Water Influx in Gas Reservoirs" J. Petroleum Technology, SPE 1244, pp. 1336-1342 (1965) (Year: 1965).*

Grimstad, B., et al. "Global optimization of multiphase flow networks using spline surrogate models" Computers & Chemical Engineering, vol. 84, pp. 237-254 (2016) (Year: 2016).*

Xu, X., et al. "Physical simulation for water invasion and water control optimization in water drive gas reservoirs" Nature: Scientific Reports, vol. 11, No. 6301 (Mar. 2021) (Year: 2021).*

CNIPA Office Action; Application No. CN202110775543.0, Aug. 16, 2021, pp. 1-3.

CNIPA Office Action; English Machine Translation; Application No. CN202110775543.0, Aug. 16, 2021; translation accessed Nov. 19, 2024. pp 1-4.

\* cited by examiner

WATER INVASION-ORIENTED DYNAMIC PRODUCTION ALLOCATION METHOD FOR WATER-BEARING CARBONATITE GAS RESERVOIR

CROSS REFERENCE TO RELATED APPLICATION

This patent application claims the benefit and priority of Chinese Patent Application No. 202110775543.0, filed on Jul. 9, 2021, the disclosure of which is incorporated by reference herein in its entirety as part of the present application.

TECHNICAL FIELD

The present disclosure relates to a water invasion-oriented dynamic production allocation method for a water-bearing carbonatite gas reservoir, and belongs to the technical field of oil and gas field development.

BACKGROUND ART

For a water-bearing gas reservoir, the invasion of formation water may lead to the change of reservoir gas-water performance in the process of gas well development, which not only increases the difficulty of gas reservoir development, but causes decline of gas well production, and reduction in the recovery and economic benefits of gas reservoir development. It is generally considered that there is a certain relation between gas well production and water invasion performance, and when water invasion occurs in a gas reservoir, water control is generally carried out by means of reasonable production allocation of single gas well. At present, many experts have established production allocation methods for gas wells in water-bearing gas reservoirs, which are often based on the improvement of traditional methods such as gas well deliverability equations after water invasion or water breakthrough. However, the development experiences of water-bearing gas reservoirs at home and abroad have proved that early measures to prevent and control water invasion have a better effect on the development of gas reservoirs.

At present, researches at home and abroad have made a lot of studies on reasonable production allocation for a gas reservoir. There are mainly following methods: numerical simulation method, gas production curve method, open flow capacity-based allocation, mass balance method, gas well inflow and outflow curve, optimization for gas well production decline, production history fitting and empirical method. These methods are usually optimized only under the condition that the static state of the reservoir will not change, without considering the impact of water invasion. There are few studies on the production allocation method of water-bearing carbonatite gas reservoir.

Moreover, existing production allocation methods for water-bearing carbonatite gas reservoirs usually have great limitations and deviations. Therefore, there is an urgent need to establish a method with high accuracy and strong operability for the production allocation of water-bearing carbonatite gas reservoirs.

SUMMARY

An objective of the present disclosure is to resolve the problems of uneven water invasion of a water-bearing carbonatite gas reservoir and early water breakthrough in a single well caused by unreasonable production allocation. On the basis of the current water invasion rate, and in combination with factors like deliverability equation, the stability of water invasion rates and the uniformity of water invasion driving, a water invasion-oriented dynamic production allocation mathematical model is established, thereby obtaining an optimal production allocation scheme.

In order to achieve the above objective, the present disclosure provides a water invasion-oriented dynamic production allocation method for a water-bearing carbonatite gas reservoir, including the following steps:

first, by a water invasion rate during a production period, calculating an average water invasion rate $\overline{W}_e$ as a water invasion reference value;

second, by comparing stability of water invasion rates under different production allocation schemes, selecting an optimal single well production allocation scheme;

third, by comparing uniformity of water invasion driving under different production allocation schemes, selecting an optimal single well production allocation scheme; and fourth, by considering a deliverability equation, stability of water invasion rates and uniformity of water invasion driving, establishing a water invasion-oriented dynamic production allocation mathematical model, where the water invasion-oriented dynamic production allocation mathematical model selects a distribution allocation range on the basis of the deliverability equation, and seeks the minimum value of the sum of the stability deviation of water invasion rates and the uniformity deviation of water invasion driving under different production allocation schemes by considering the stability water invasion rates and the uniformity of water invasion driving, so as to select an optimal production allocation scheme to address the influence of water invasion on production allocation in a water-bearing carbonatite gas reservoir, optimal production allocation is obtained after comprehensive consideration, and the water invasion-oriented dynamic production allocation mathematical model is expressed as follows:

$$\begin{cases} P_R^2 - P_{wf}^2 = Aq_{production\ allocation} + Bq_{production\ allocation}^2 \\ S_{optimal} = (\sigma_j + \delta_j)_{min} \end{cases};$$

where $P_R$ denotes a formation pressure during a production period, in unit of MPa; $P_{wf}$ denotes a flowing bottom-hole pressure, in unit of MPa; $q_{production\ allocation}$ denotes a stable production rate during normal production after pilot production, in unit of $10^4$ m³/d; $S_{optimal}$ denotes a comprehensive deviation of an optimal production allocation scheme $q_j$, in unit of %; $\sigma_j$ denotes a stability deviation of a water invasion rate corresponding to a jth production allocation scheme, in unit of %, $\delta_j$ denotes a uniformity deviation of water invasion driving in a certain direction corresponding to a jth production allocation scheme, in unit of %; and A denotes a laminar coefficient, and B denotes a turbulence coefficient.

In the foregoing water invasion-oriented dynamic production allocation method for a water-bearing carbonatite gas reservoir, by comparing stability of water invasion rates under different production allocation schemes, selecting an optimal single well production allocation scheme, which specifically includes:

first, based on a deliverability equation from a formation to a wellbore, and upper and lower limits of a laminar coefficient A and a turbulence coefficient B, calculating flux of formation water flowing into the wellbore according to a formation pressure and a flowing bottomhole pressure during the production period, and selecting j single well production allocation schemes $q_1, q_2, q_3, \ldots, q_j$;

where the deliverability equation is $$P_R^2 - P_{wf}^2 = Aq_{production\ allocation} + Bq_{production\ allocation}^2;$$

second, based on a numerical simulation method, determining water invasion rates $U_1, U_2, U_3, \ldots, U_j$ corresponding to different production allocation schemes $q_1, q_2, q_3, \ldots, q_j$;

third, according to the water invasion reference value $\overline{W}_e$ obtained, comparing water invasion rates $U_1, U_2, U_3, \ldots, U_j$ corresponding to different production allocation schemes $q_1, q_2, q_3, \ldots, q_j$, and determining a deviation between the water invasion rate corresponding to each production allocation scheme and the water invasion reference value by average deviation calculation, where the stability deviation of water invasion rates is expressed as:

$$\sigma_j = \sum_{i=1}^{t} |U_j - \overline{W}_e|/t \times 100\%$$

where $U_j$ denotes a water invasion rate corresponding to a jth production allocation scheme, in unit of m³/d; $\overline{W}_e$ denotes a water invasion reference value, in unit of m³/d; and t denotes cumulative producing days, in unit of d; and fourth, comparing stability deviations $\sigma_1, \sigma_2, \sigma_3, \ldots, \sigma_j$ of water invasion rates corresponding to different production allocation schemes $q_1, q_2, q_3, \ldots, q_j$ to seek a minimum stability deviation min$\sigma_j$ of water invasion rates, where at this time, the corresponding $q_j$ is the optimal allocation scheme considering the stability of water invasion rates;

In the foregoing water invasion-oriented dynamic production allocation method for a water-bearing carbonatite gas reservoir, by comparing uniformity of water invasion driving under different production allocation schemes, selecting an optimal single well production allocation scheme, which specifically includes:

first, based on a numerical simulation method, determining water invasion rates in direction a, b, . . . , f at moment i corresponding to different production allocation schemes $q_1, q_2, q_3, \ldots, q_j$;

second, based on the water invasion reference value $\overline{W}_e$ obtained in combination with the water invasion rates in direction a, b, . . . , f, determining, by average deviation calculation, a deviation between the water invasion reference value and the water invasion rates in direction a, b, . . . , f throughout the production period for indicating the uniformity of water invasion driving, where the uniformity deviation of water invasion driving is expressed as:

$$\delta_{direction} = \sum_{i=1}^{t} |D_{direction} - \overline{W}_e|/t \times 100\%;$$

where $\delta_{direction}$ denotes a uniformity deviation of water invasion driving in a certain direction, in unit of %; and $D_{direction}$ denotes a water invasion rate in a certain direction, in unit of m³/d;

third, aiming at different production allocation schemes $q_1, q_2, q_3, \ldots, q_j$, calculating uniformity deviations $\delta_a, \delta_b, \ldots, \delta_f$ of water invasion driving in a single direction of direction a, b, . . . , f throughout the production period, and then calculating an average value of the uniformity deviation of water invasion driving in each single direction corresponding to each production allocation scheme as uniformity deviations $\delta_1, \delta_2, \delta_3, \ldots, \delta_j$ of water invasion driving corresponding to production allocation schemes $q_1, q_2, q_3, \ldots, q_j$; and fourth, comparing uniformity deviations $\delta_1, \delta_2, \delta_3, \ldots, \delta_j$ of water invasion driving under different production allocation schemes $q_1, q_2, q_3, \ldots, q_j$ to seek a minimum uniformity deviation mine of water invasion driving, where at this time, the corresponding $q_j$ is regarded as the optimal production allocation value with the uniformity of water invasion driving considered.

DETAILED DESCRIPTION OF THE EMBODIMENTS

The present the number is further described below with reference to the accompanying drawings and embodiments.

Figure 1:
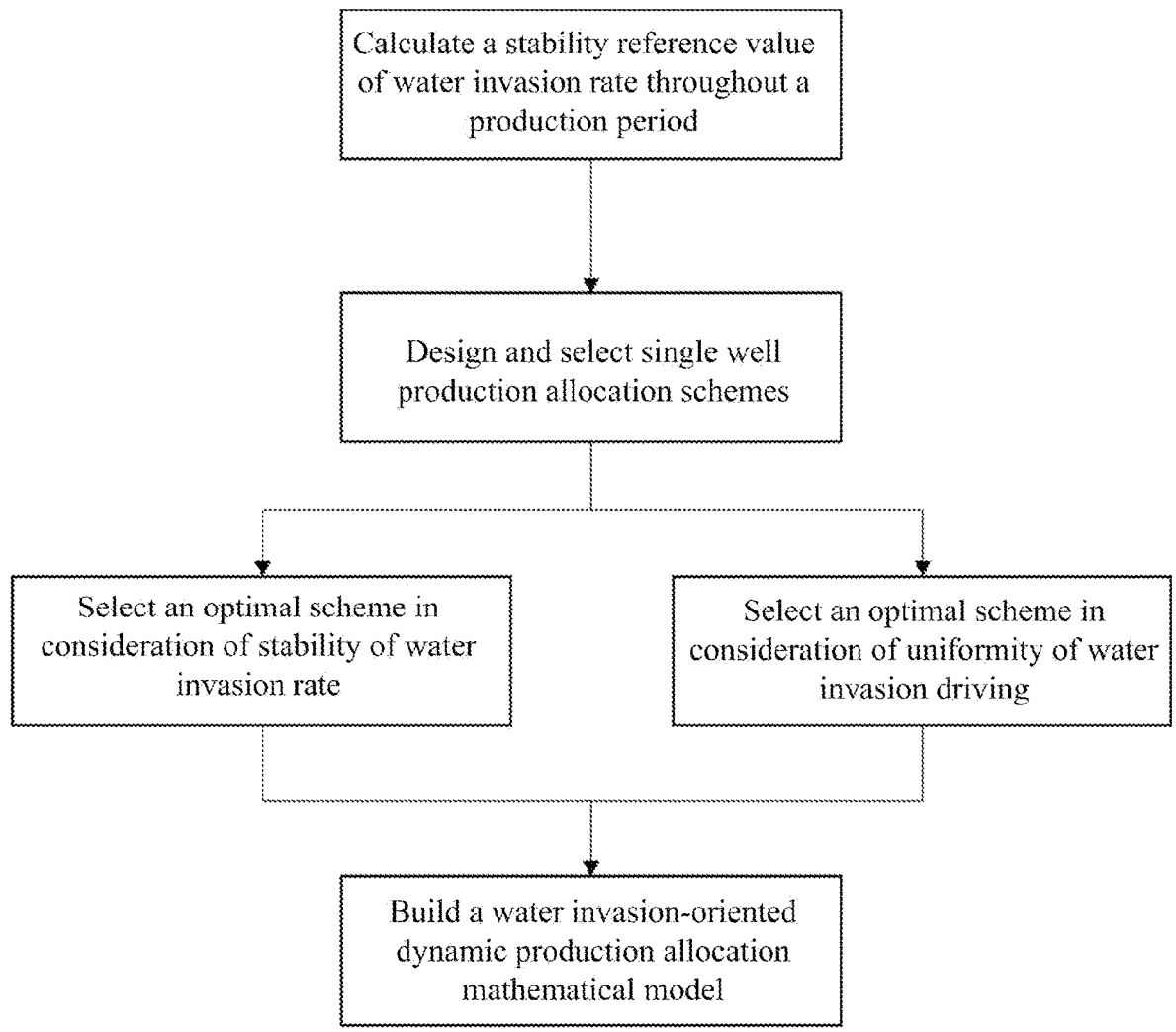
FIG. 1 is a technical route of a method according to the present disclosure.

The present disclosure provides a water invasion-oriented dynamic production allocation method for a water-bearing carbonatite gas reservoir. As shown in the technical route in FIG. 1, the method includes the following steps:

first, according to a water invasion rate during a production period, calculating an average water invasion rate $\overline{W}$, as a water invasion reference value;

second, by comparing stability of water invasion rates under different production allocation schemes, selecting an optimal single well production allocation scheme;

third, by comparing uniformity of water invasion driving under different production allocation schemes, selecting an optimal single well production allocation scheme; and fourth, by considering a deliverability equation, stability of water invasion rates and uniformity of water invasion driving, establishing a water invasion-oriented dynamic production allocation mathematical model, where the water invasion-oriented dynamic production allocation mathematical model selects a distribution allocation range on the basis of the deliverability equation, and seeks the minimum value of the sum of the stability deviation of water invasion rates and the uniformity deviation of water invasion driving under different production allocation schemes by considering the stability water invasion rates and the uniformity of water invasion driving, so as to select an optimal production allocation scheme to address the influence of water invasion on production allocation in a water-bearing carbonatite gas reservoir, optimal production allocation is obtained after comprehensive consideration, and the water invasion-oriented dynamic production allocation mathematical model is expressed as follows:

$$\begin{cases} P_R^2 - P_{wf}^2 = Aq_{production\,allocation} + Bq_{production\,allocation}^2 \\ S_{optimal} = (\sigma_j + \delta_j)_{min} \end{cases};$$

where $P_R$ denotes a formation pressure during a production period, in unit of MPa; $P_{wf}$ denotes a flowing bottomhole pressure, in unit of MPa; $q_{production\,allocation}$ denotes a stable production rate during normal production after pilot production, in unit of $10^4$ m³/d; $\sigma$ denotes a stability deviation of a water invasion rate, in unit of %; $\delta$ denotes a uniformity deviation of water invasion driving in a certain direction, in unit of %; $q_j$ denotes a theoretical value of an optimal parameter of the production allocation scheme, in unit of $10^4$ m³/d; and A denotes a laminar coefficient, and B denotes a turbulence coefficient.

Furthermore, by comparing stability of water invasion rates under different production allocation schemes, select an optimal single well production allocation scheme, which specifically includes:

first, based on a deliverability equation from a formation to a wellbore, and upper and lower limits of a laminar coefficient A and a turbulence coefficient B, calculating flux of formation water flowing into the wellbore according to a formation pressure and a flowing bottomhole pressure during the production period, and selecting j single well production allocation schemes $q_1$, $q_2$, $q_3$, $q_1$;

where the deliverability equation is $$P_R^2 - P_{wf}^2 = Aq_{production\,allocation} + Bq_{production\,allocation}^2;$$

second, based on a numerical simulation method, determining water invasion rates $U_1$, $U_2$, $U_3$, ..., $U_1$ corresponding to different production allocation schemes $q_1$, $q_2$, $q_3$, ..., $q_j$;

third, according to the water invasion reference value $\overline{W}_e$ obtained, comparing water invasion rates $U_1$, $U_2$, $U_3$, ..., $U_j$ corresponding to different production allocation schemes $q_1$, $q_2$, $q_3$, ..., $q_j$, and determining a deviation between the water invasion rate corresponding to each production allocation scheme and the water invasion reference value by average deviation calculation, where the stability deviation of water invasion rates is expressed as:

$$\sigma = \sum_{i=1}^{t} |U_j - \overline{W}_e|/t \times 100\%$$

where $U_j$ denotes a water invasion rate corresponding to a jth production allocation scheme, in unit of m³/d; $\overline{W}_e$ denotes a water invasion reference value, in unit of m³/d; and t denotes cumulative producing days, in unit of d; and fourth, comparing stability deviations $\sigma_1$, $\sigma_2$, $\sigma_3$, ..., $\sigma_j$ of water invasion rates corresponding to different production allocation schemes $q_1$, $q_2$, $q_3$, ..., $q_j$ to seek a minimum stability deviation $min\sigma_j$ of water invasion rates, where at this time, the corresponding $q_j$ is the optimal allocation scheme considering the stability of water invasion rates;

Furthermore, by comparing uniformity of water invasion driving under different production allocation schemes, selecting an optimal single well production allocation scheme, which specifically includes:

first, based on a numerical simulation method, determining water invasion rates in direction a, b, ..., f at moment i corresponding to different production allocation schemes $q_1$, $q_2$, $q_3$, ..., $q_j$;

second, based on the water invasion reference value $\overline{W}_e$ obtained in combination with the water invasion rates in direction a, b, ..., f, determining, by average deviation calculation, a deviation between the water invasion reference value and the water invasion rates in direction a, b, ..., f throughout the production period for indicating the uniformity of water invasion driving, where the uniformity deviation of water invasion driving is expressed as:

$$\delta_{direction} = \sum_{i=1}^{t} |D_{direction} - \overline{W}_e|/t \times 100\%$$

where $\delta_{direction}$ denotes a uniformity deviation of water invasion driving in a certain direction, in unit of %; and $D_{direction}$ denotes a water invasion rate in a certain direction, in unit of m³/d;

third, aiming at different production allocation schemes $q_1$, $q_2$, $q_3$, ..., $q_j$, calculating uniformity deviations $\delta_a$, $\delta_b$, ..., $\delta_f$ of water invasion driving in a single direction of direction a, b, f throughout the production period, and then calculating an average value of the uniformity deviation of water invasion driving in each single direction corresponding to each production allocation scheme as uniformity deviations $\delta_1$, $\delta_2$, $\delta_3$, ..., $\delta_j$ of water invasion driving corresponding to production allocation schemes $q_1$, $q_2$, $q_3$, ..., $q_j$; and fourth, comparing uniformity deviations $\delta_1$, $\delta_2$, $\delta_3$, ..., $\delta_j$ of water invasion driving under different production allocation schemes $q_1$, $q_2$, $q_3$, ..., $q_j$ to seek a minimum uniformity deviation min $\delta_j$ of water invasion driving, where at this time, the corresponding $q_j$ is regarded as the optimal production allocation value with the uniformity of water invasion driving considered.

Figure 2:
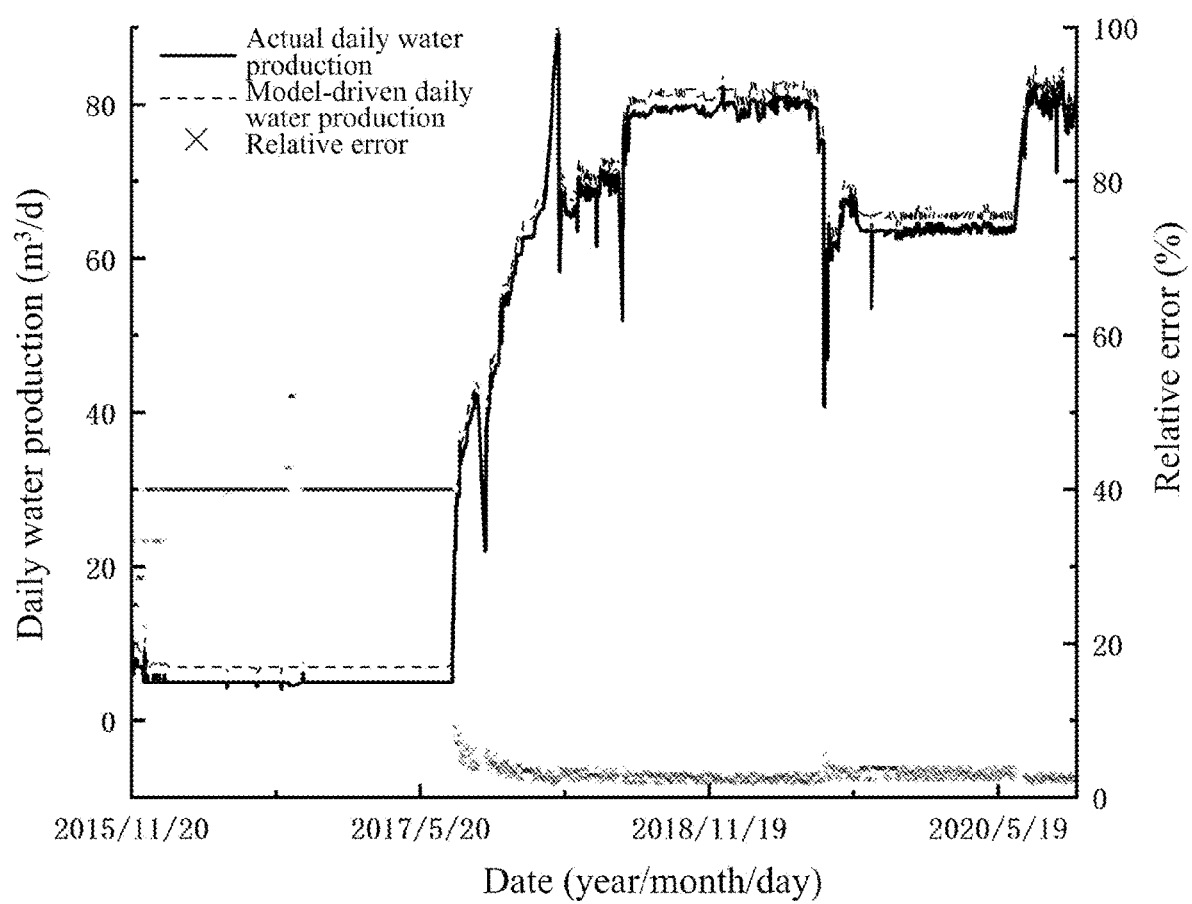
FIG. 2 is a historical fitting curve established for daily water production of a single well.
Figure 3:
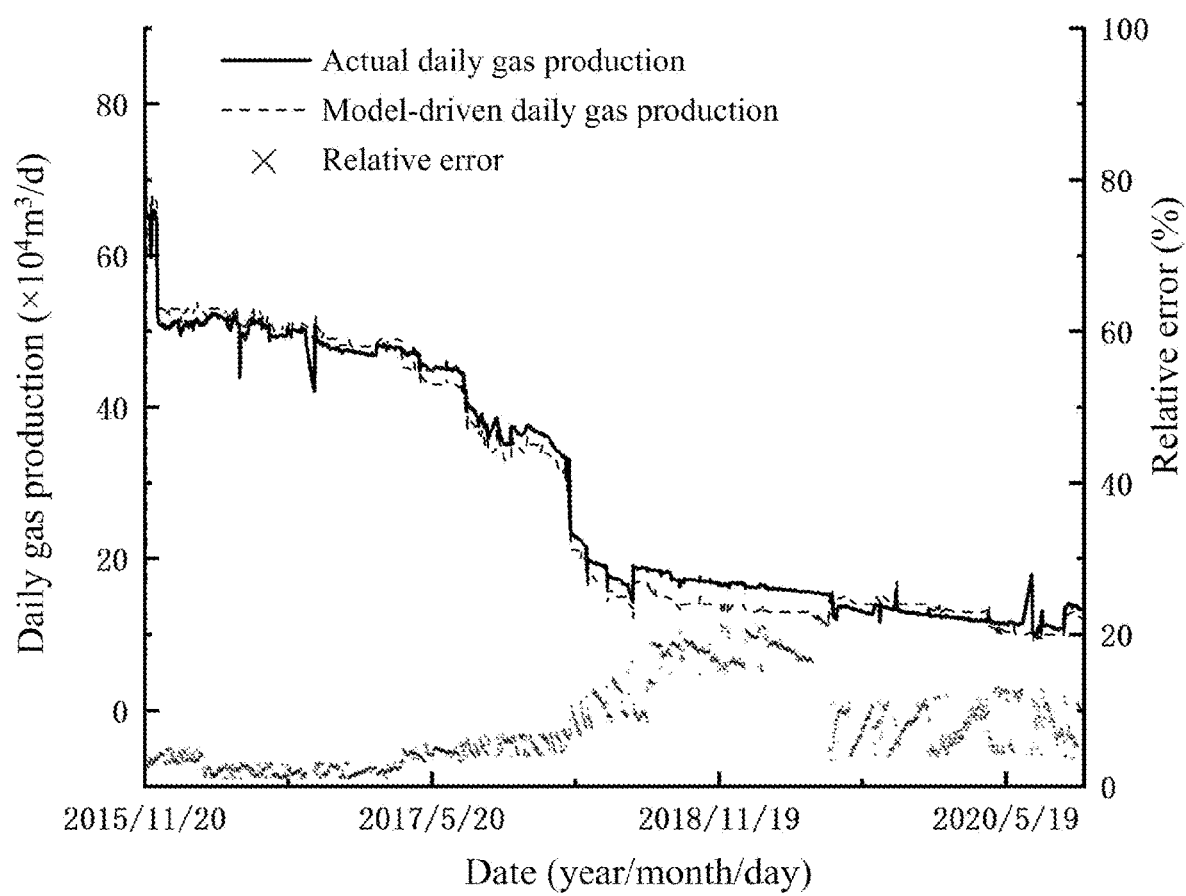
FIG. 3 is a historical fitting curve established for daily gas production of a single well.

For example, well X103 of a carbonatite gas reservoir located in Sichuan Basin was put into production on Dec. 6, 2012. In November 2015, by testing, water invasion occurred in the gas well, followed by production decline. On Jul. 21, 2017, water breakthrough occurred in the gas well. Taking this well as an example, a single well-based numerical simulation is done, and the history fitting is carried out, as shown in FIG. 2 and FIG. 3. The historical fitting curve and error distribution result show that a high fitting accuracy, and the established single well-based numerical simulation model can effectively characterize the production performance of the well X103.

Figure 4:
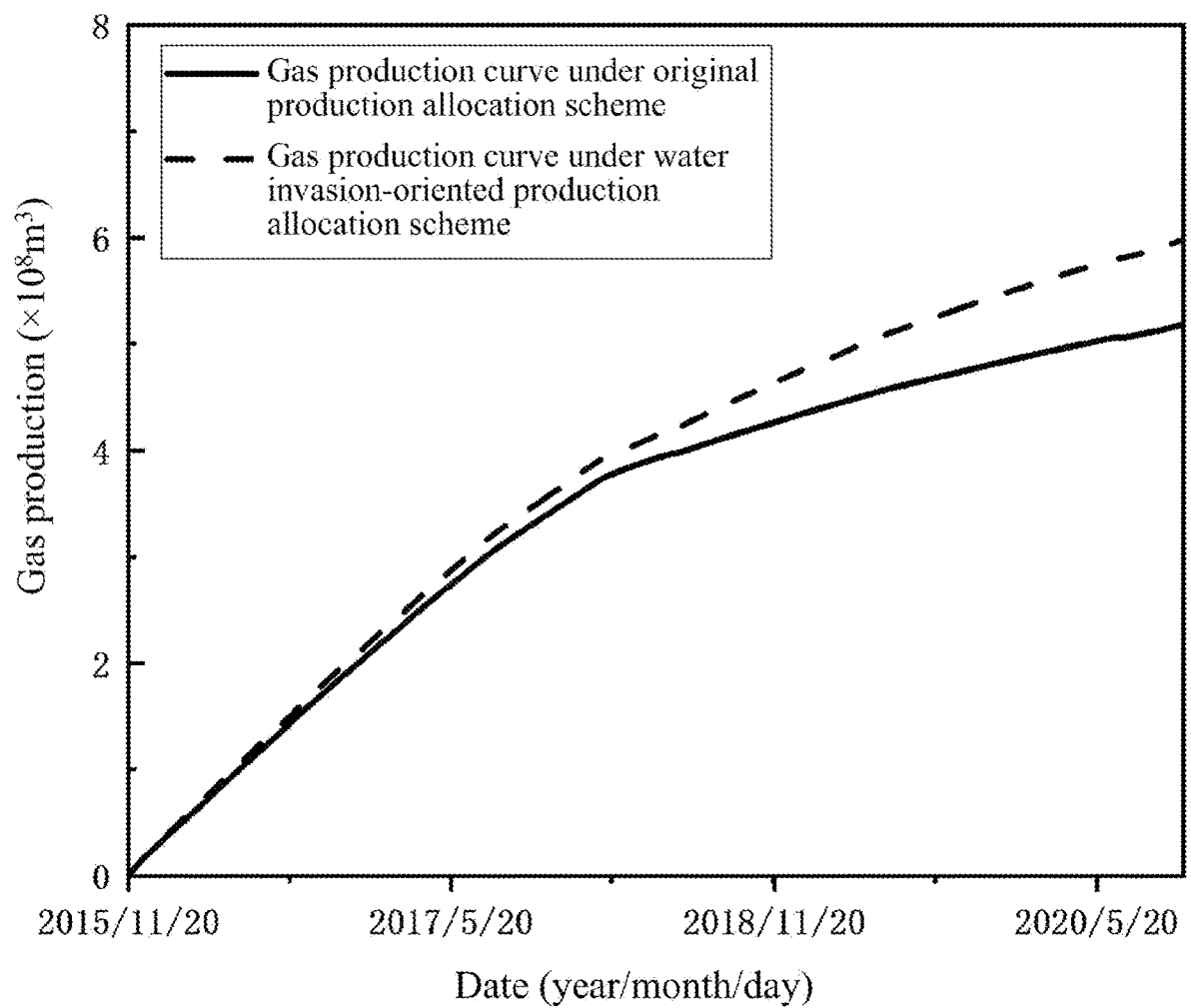
FIG. 4 is a curve showing the comparison between daily gas production under a new production allocation method and daily gas production in actual situations.

If the original production plan remains effective after water invasion occurs, the cumulative gas production of well X103 is 5.18×10⁸ m³. If a new water invasion-oriented production allocation method is adopted, as shown in FIG. 4, the cumulative gas production of gas well X103 is 5.99×10⁸ m³ under the prediction of single well-based numerical simulation, which is 15.53% higher than that under the original production allocation scheme. This production allocation method can basically realize the rational utilization of formation water energy, effectively improve the recovery of single gas well, which provides theoretical guidance for the development of water-bearing gas reservoir in an oil field.

What is claimed is:

1. A method for producing gas from a water-bearing carbonatite gas reservoir, comprising the following steps:
according to a water invasion rate during a production period, calculate an average water invasion rate $\overline{W_e}$ as a water invasion reference value;
compare stability of water invasion rates under different production allocation schemes, and select an optimal single well production allocation scheme, by:
calculate flux of formation water flowing into the wellbore according to a formation pressure and a flowing bottomhole pressure during the production period based on a deliverability equation from a formation to a wellbore, and upper and lower limits of a laminar coefficient A and a turbulence coefficient B, and select j single well production allocation schemes $q_1$, $q_2$, $q_3$, . . . , $q_j$;
based on a numerical simulation method, determine water invasion rates $U_1$, $U_2$, $U_3$, . . . , $U_j$ corresponding to different production allocation schemes $q_1$, $q_2$, $q_3$, . . . , $q_j$;
according to the water invasion reference value $\overline{W_e}$ obtained, compare water invasion rates $U_1$, $U_2$, $U_3$, . . . , $U_j$ corresponding to different production allocation schemes $q_1$, $q_2$, $q_3$, . . . , $q_j$, and determine a deviation between the water invasion rate corresponding to each production allocation scheme and the water invasion reference value by average deviation calculation, wherein the stability deviation of water invasion rates is expressed as:

$$\sigma = \sum_{i=1}^{t} |U_j - \overline{W_e}|/t \times 100\%$$

wherein $\sigma_j$ denotes a stability deviation of a water invasion rate corresponding to a jth production allocation scheme, in unit of %; $U_j$ denotes a water invasion rate corresponding to a jth production allocation scheme, in unit of m³/d; $\overline{W_e}$ denotes a water invasion reference value, in unit of m³/d; and t denotes cumulative producing days, in unit of d; and
compare stability deviations $\sigma_1$, $\sigma_2$, $\sigma_3$, . . . , $\sigma_j$ of water invasion rates corresponding to different production allocation schemes $q_1$, $q_2$, $q_3$, . . . , $q_j$ to seek a minimum stability deviation min $\sigma_j$ of water invasion rates;
select an optimal single well production allocation scheme by comparing uniformity of water invasion driving under different production allocation schemes, by:
determine water invasion rates in direction a, b, . . . , f at moment i corresponding to different production allocation schemes $q_1$, $q_2$, $q_3$, . . . , $q_j$, based on a numerical simulation method;
based on the water invasion reference value $\overline{W_e}$ obtained in combination with the water invasion rates in direction a, b, . . . , f, determine, by average deviation calculation, a deviation between the water invasion reference value and the water invasion rates in direction a, b, . . . , f throughout the production period for indicating the uniformity of water invasion driving, wherein the uniformity deviation of water invasion driving is expressed as:

$$\delta_{direction} = \sum_{i=1}^{t} |D_{direction} - \overline{W_e}|/t \times 100\%$$

wherein $\delta_{direction}$ denotes a uniformity deviation of water invasion driving in a certain direction, in unit of %; and $D_{direction}$ denotes a water invasion rate in a certain direction, in unit of m³/d;
aiming at different production allocation schemes $q_1$, $q_2$, $q_3$, . . . , $q_j$, calculate uniformity deviations $\delta_a$, $\delta_b$, . . . , $\delta_f$ of water invasion driving in a single direction of direction a, b, . . . , f throughout the production period, and then calculate an average value of the uniformity deviation of water invasion driving in each single direction corresponding to each production allocation scheme as uniformity deviations $\delta_1$, $\delta_2$, $\delta_3$, . . . , $\delta_j$ of water invasion driving corresponding to production allocation schemes $q_1$, $q_2$, $q_3$, . . . , $q_j$;
compare stability deviations $\delta_1$, $\delta_2$, $\delta_3$, . . . , $\delta_j$ of water invasion driving under different production allocation schemes $q_1$, $q_2$, $q_3$, . . . , $q_j$; to seek a minimum stability deviation min$\delta_j$ of water invasion driving; and
by considering a deliverability equation, stability of water invasion rates and uniformity of water invasion driving, establish a water invasion-oriented dynamic production allocation mathematical model, where the water invasion-oriented dynamic production allocation mathematical model selects a distribution allocation range on the basis of the deliverability equation, and seeks the minimum value of the sum of the stability deviation of water invasion rates and the uniformity deviation of water invasion driving under different production allocation schemes by considering the stability water invasion rates and the uniformity of water invasion driving, so as to select an optimal production allocation scheme to address the influence of water invasion on production allocation in a water-bearing carbonatite gas reservoir,
wherein the water invasion-oriented dynamic production allocation mathematical model is expressed as follows:

$$\begin{cases} P_R^2 - P_{wf}^2 = Aq_{production\ allocation} + Bq_{production\ allocation}^2 \\ S_{optimal} = (\sigma_j + \delta_j)_{min} \end{cases}$$

wherein $S_{optimal}$ denotes a comprehensive deviation of an optimal production allocation scheme $q_j$, in unit of %, wherein the deliverability equation is $P_R^2 - P_{wf}^2 = Aq_{production\ allocation} + Bq_{production\ allocation}^2$, wherein $P_R$ denotes a formation pressure during a production period, in unit of MPa; $P_{wf}$ denotes a flowing bottomhole pressure, in unit of MPa; $q_{production\ allocation}$ denotes a stable production rate during normal production after pilot production, in unit of $10^4$m³/d; and A denotes a laminar coefficient, and B denotes a turbulence coefficient;
produce gas by adjusting each j single well production allocation to the optimal invasion-oriented production allocation scheme $q_1$, $q_2$, $q_3$, . . . , $q_j$; according to the water invasion-oriented dynamic production allocation mathematical model obtained by minimizing the value of the sum of the stability deviation of water invasion rates, wherein the uniformity deviation of water invasion driving indicates the optimal invasion-oriented production allocation plan, wherein, by adjusting each j single well production allocation to the optimal invasion-oriented production allocation scheme $q_1$, $q_2$, $q_3 \ldots q_j$, yields from the water-bearing carbonatite gas reservoir are increased relative to yields of gas produced under an original production allocation scheme.

* * * * *